United States Patent Office 3,017,432

Patented Jan. 16, 1962

1

3,017,432

PROCESS FOR THE PRODUCTION OF 2-CIS-β-IONYLIDENE ACETIC ACID

Karl Eiter, Koln-Stammheim, and Ernst Truscheit, Leverkusen, Germany, assignors to Farbenfabriken Bayer Aktiengesellschaft, Leverkusen, Germany, a corporation of Germany No Drawing. Filed Aug. 17, 1959, Ser. No. 833,969

Claims priority, application Germany Aug. 20, 1958

4 Claims. (Cl. 260—514)

This invention relates to a process for the production of ionylidene acetic acid and is more particularly concerned with a process for the production of 2-cis-β-ionylidene acetic acid.

It is an object of the present invention to provide a process for the production of 2-cis-β-ionylidene acetic acid. A further object of the invention is to provide this compound in a simple and most economic manner. A still further object of the present invention is to provide a process for the production of 2-cis-β-ionylidene acetic acid by reacting β-acyclocitral with γ-halo-β-methyl crotono nitrile. Still further objects will become apparent hereinafter.

These objects are attained in accordance with the present invention by reacting β-cyclocitral (I) with γ-halo-β-methyl crotono nitrile (II) in the presence of zinc under the conditions of the Reformatsky synthesis converting the δ-imidolactone (III) thus formed in aqueous medium and with ammonia being split off into the lactone (IV) and transforming this compound by treating with nucleophilic agents to give 2-cis-β-ionylidene acetic acid (V).

The course of the reaction can be shown by the following formula diagram:

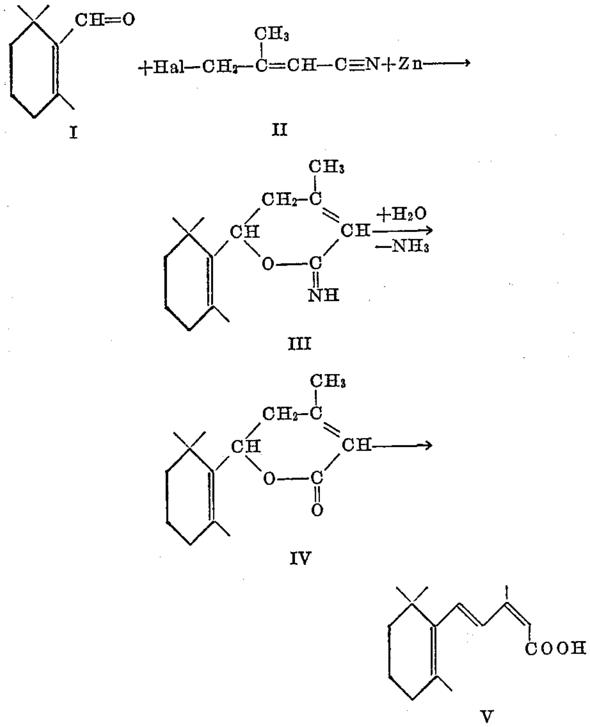

Advantageously the γ-chloro-, bromo- and iodo-β-methyl crotono nitriles are used.

The reaction of the β-cyclocitral with the γ-halo-β-methyl crotono nitrile and zinc takes place under the conditions of the Reformatsky reaction, in that the β-cyclocitral for example is dissolved in a solvent, such as

2 tetrahydrofuran, dioxane, benzene, toluene or mixtures of these solvents with diethyl ether, the zinc necessary for the reaction is added in one of the usual forms, for example as powdered zinc, zinc wool or zinc chips and then the γ-halo-β-methyl crotono nitrile is added (dissolved in one of the aforementioned solvents if desired). The reaction advantageously takes place at somewhat elevated temperature, for example at about 40 to 110° C. The reaction can however also be so conducted that the zinc gradually has added thereto a mixture of the reaction components which may be dissolved in a solvent.

To produce good yields it may be advisable to introduce the γ-halo-β-methyl crotono nitrile in excess over the β-cyclocitral. In this case, 1.2 to 1.5 mols of halogen component are used per mol of cyclocitral. The zinc is used in excess or in an equimolar quantity to the halogen component.

The reaction product formed by this reaction can be worked up by the usual methods of the Reformatsky synthesis, for example by treating with dilute acids, for example hydrochloric acid, sulfuric acid, phosphoric acid or acetic acid. The acid aqueous phase then contains the imidolactone dissolved as a salt, while a hydroxynitrile forming with a smaller yield can easily be extracted with ether. The salt of imidolactone can be isolated by usual methods, for example by saturating the aqueous solution with sodium chloride and extracting the salted out product by shaking with a solvent, such as methyl or ethyl formate, methyl or ethyl acetate, methylene chloride, chloroform, carbon tetrachloride, tetrahydrofuran or dioxane. The free imidolacetone can be obtained from the salt by conventional methods, for example by treatment with aqueous alkalis, such as caustic soda or caustic potash solutions or solutions of potassium carbonate, sodium carbonate or sodium bicarbonate.

The conversion of the imidolactone into the lactone can be effected by a treatment with water e.g. by the imidolactone dissolved in an organic solvent, for example ether, being shaken with water or by boiling the imiodolactone in aqueous alcoholic solution. The 2-cis-β-ionylidene acetic acid can be obtained from the lactone as a salt of the unsaturated acid by treating the lactone with nucleophilic agents, such as alcoholates or alkali metal amides, in anhydrous medium.

The 2-cis-β-ionylidene acetic acid is an intermediate product for the syntheses of carotenoids.

The invention is further illustrated by the following examples without in any way limiting it thereto.

EXAMPLE 1

(a) *δ-Imidolactone of 5-(2′,6′,6′-trimethylcyclohexen-1′-yl)-5-hydroxy-3-methyl-pent-2-enoic acid*

[6-(2′,6′,6′-TRIMETHYLCYCLOHEXEN-1′-YL)-4-METHYL-5,6-DIHYDRO-2-IMINO-1,2-PYRANE]

In a three-necked flask fitted with a reflux condenser, thermometer, dropping funnel, stirrer and inlet pipe for nitrogen, the mixture of 15.2 g. of β-cyclocitral and 20 ml. of absolute tetrahydrofuran with 11 g. of powdered zinc (preferably corroded with 2% hydrochloric acid, washed with water, ethanol, acetone and finally with absolute ether and dried in vacuo at 100° C.) is heated to about 70° C. while stirring in a nitrogen atmosphere. Then the mixture of 22 g. of γ-bromo-β-methyl-crotono nitrile and 20 ml. of absolute tetrahydrofuran is gradually added dropwise while gently heating, so that the contents of the flask boil violently. The reaction temperature is 73 to 75° C. When the dropwise addition is completed and the reaction has subsided, the mixture is heated for another 15 to 20 minutes at boiling point to complete the reaction. Thereafter, the contents of the flask are cooled to about 0° C. and about 100 ml. of ether are added while stirring. With external cooling, 200 to 250 ml. of N-hydrochloric acid are run in and the contents of the flask are transferred to a separating funnel. About 100 to 150 ml. of water are added, the mixture is thoroughly shaken the phases are separated and the ether phase is extracted by again shaking twice with N-hydrochloric acid. Solid sodium bicarbonate is added to the combined aqueous phases at 0° C. until there is a weakly alkaline reaction. The oily reaction product separating out is extracted with ether, the ethereal solution is washed with water, dried over sodium sulfate and the ether is evaporated off under reduced pressure. About 19.5 g. of 6-(2′,6′,6′-trimethylcyclohexen-1′-yl)-4-methyl-5,6-dihydro-2-imino-1,2-pyrane (83–84% of the theoretical) are obtained as a viscous yellow oil.

The ultra-violet absorption spectrum shows the maximum at 223 mμ (ε=15,500) which is characteristic for two conjugated double bonds. The infra-red absorption spectrum has the absorption characteristic for the =N—H-group at 3200 cm.$^{-1}$, the absorption characteristic for the —C=N-bond at 1660 cm.$^{-1}$ and the absorption characteristic for the —C=C-bond conjugated therewith at 1615 cm.$^{-1}$ (b) *δ - Lactone of 5-(2′,6′,6′-trimethylcyclohexen-1′-yl)-5-hydroxy-3-methyl-pent-2-enoic acid*

28 ml. of water are added to the solution in 37 ml. of ethanol of 4 g. of the imidolactone obtained (according to Example 1*a*) and the mixture is heated to boiling point for about 15 hours in a nitrogen atmosphere under reflux, whereby ammonia escapes. The alcohol is evaporated off, for the major part under reduced pressure, the residue is diluted with water and extracted by shaking several times with ether. The ethereal solution is first of all washed with 10% sulfuric acid, then with water and finally with sodium bicarbonate solution, and then dried over sodium sulfate. After the ether has been evaporated, there remain about 3.6 g. (=90% of the theoretical) of the δ-lactone of 5-(2′,6′,6′-trimethylcyclohexene-1′-yl)-5-hydroxy-3-methyl-pent-2-enoic acid, which crystallises out from its low-cooled solution in petroleum ether and a small quantity of ether. M.P. 81° C.

The ultra-violet absorption maximum is at 217 mμ (log. ε=4.1).

*Analysis.* — $C_5H_{22}O_2$ (molecular weight: 234.3): Calculated — C=76.88%; H=9.47%; O=13.66%. Found—C=77.06%; H=9.40%; O=13.90%.

The same result is obtained if the ethereal solution of the imidolactone is shaken for 15 to 20 hours with possibly weakly acidified water and the ether phase is worked up as indicated above.

(c) *2 - cis - 5 - (2′,6′,6′ - trimethylcyclohexen - 1′ - yl)-3-methyl-penta-2,4-dienoic acid; (2-cis-β-ionylidene acetic acid)*

The solution in 180 ml. of absolute ethanol of 30 g. of the lactone obtained in Example 1(*b*) is heated with the solution of 7.5 g. of sodium in 180 ml. of absolute ethanol for 1 hour under reflux on a boiling water bath or the solution is left to stand for 5 to 10 hours at room temperature. The major part of the ethanol is then evaporated off under reduced pressure and the residue is dissolved in water. By adding 10% phosphoric acid, the 2-cis-β-ionylidene acetic acid is precipitated. Yield: about 30 g. (substantially quantitative); M.P. 103 to 104° C. (from ether+petroleum ether).

*Analysis.* — $C_{15}H_{22}O_2$ (molecular weight: 234.3):

Calculated—C=76.88%; H=9.47%; O=13.66% act.; H=0.43%. Found — C=76.94%; H=9.61%; O=13.90% act.; H=0.46%.

What we claim is:

1. A process for the preparation of 2-cis-β-ionylidene acetic acid, which comprises the steps of (1) refluxing in an organic solvent medium selected from the group consisting of tetrahydrofurane, dioxane, benzene, toluene and mixtures thereof with diethyl ether, β-cyclocitral with at least equimolecular amounts of γ-bromo-β-methyl-crotono nitrile in the presence of zinc, (2) acidifying the reaction mixture thereby formed with a dilute aqueous acid to produce the salt of δ-imido lactone, (3) hydrolyzing the thus produced salt of δ-imido lactone whereby ammonia is split off and the corresponding lactone produced, (4) contacting the thus produced lactone with a member selected from the group consisting of alkali alkoxides containing up to 5 carbon atoms and alkali amides in a substantially anhydrous medium to thereby form the alkali salt of the isomeric 2-cis-β-ionylidene acetic acid, and (5) acidifying the reaction mixture containing said salt with the mineral acid to liberate the corresponding acid from its salt to produce the isomeric 2-cis-β-ionylidene acetic acid.

2. A process according to claim 1, which comprises effecting the refluxing of β-cyclocitral with γ-bromo-β-methyl-crotono nitrile at a temperature within the range of from about 40 to 110° C.

3. A process according to claim 1, which comprises utilizing 1.2 to 1.5 mols of γ-bromo-β-methyl-crotono nitrile per mol of β-cyclocitral.

4. A process for preparing 2-cis-5-(2′,6′,6′-trimethylcyclohexen-1′-yl)-3-methyl-penta-2,4-dienoic acid (2-cis-β-ionylidene acetic acid), which comprises the steps of (1) refluxing β-cyclocitral with γ-bromo-β-methyl-crotono nitrile in a tetrahydrofuran medium in the presence of zinc, (2) acidifying the reaction mixture thereby formed with N-hydrochloric acid in an aqueous medium to produce 6-(2′,6′,6′-trimethylcyclohexen-1′-yl)-4-methyl-5,6-dihydro-2-imino-1,2-pyrane in the form of its salt, (3) hydrolyzing the thus produced aqueous phase containing the 6-(2′,6′,6′-trimethylcyclohexen-1′-yl)-4-methyl-5,6-dihydro-2-imino-1,2-pyrane in the form of its salt, whereby ammonia is split off to produce the δ-lactone of 5-(2′,6′,6′-trimethylcyclohexen - 1′ - yl)-5-hydroxy-3-methyl-pent-2-enoic acid, (4) contacting the thus produced lactone with sodium ethylate in a substantially anhydrous medium to thereby form the alkali salt of 2-cis-5-(2′,6′,6′-trimethylcyclohexen-1′-yl)-3-methyl-penta-2,4-dienoic acid, and (5) acidifying the reaction mixture containing said salt with phosphoric acid to liberate the acid from its salt to produce the 2-cis-5-(2′,6′,6′-trimethylcyclohexen-1′-yl)-3-methyl-penta-2,4-dienoic acid (2-cis-β-ionylidene acetic acid).

References Cited in the file of this patent

UNITED STATES PATENTS 2,369,158 Milas ---------------- Feb. 13, 1945

FOREIGN PATENTS 198,252 Austria ---------------- June 25, 1958

812,841 Great Britain ------------ May 6, 1959

OTHER REFERENCES

Brewster: "Organic Chem." 2nd Ed., page 285 (1954), third printing, first printing, May 1953.

UNITED STATES PATENT OFFICE
CERTIFICATE OF CORRECTION

Patent No. 3,017,432 January 16, 1962

Karl Eiter et al.

It is hereby certified that error appears in the above numbered patent requiring correction and that the said Letters Patent should read as corrected below.

Column 1, line 21, for "β-acyclocitral" read -- β-cyclocitral --; column 2, line 31, for "imidolacetone" read -- imidolactone --; column 3, line 39, for "-trimethylcyclohexene-" read -- -trimethylcyclohexen- --; line 45, for "$C_5H_{22}O_2$" read -- $C_{15}H_{22}O_2$ --.

Signed and sealed this 5th day of June 1962.

(SEAL)
Attest:

ERNEST W. SWIDER
Attesting Officer

DAVID L. LADD
Commissioner of Patents